C. E. BROOKS.
TRANSMISSION MECHANISM.
APPLICATION FILED JUNE 12, 1911.
1,058,703.
Patented Apr. 8, 1913.
3 SHEETS—SHEET 1.
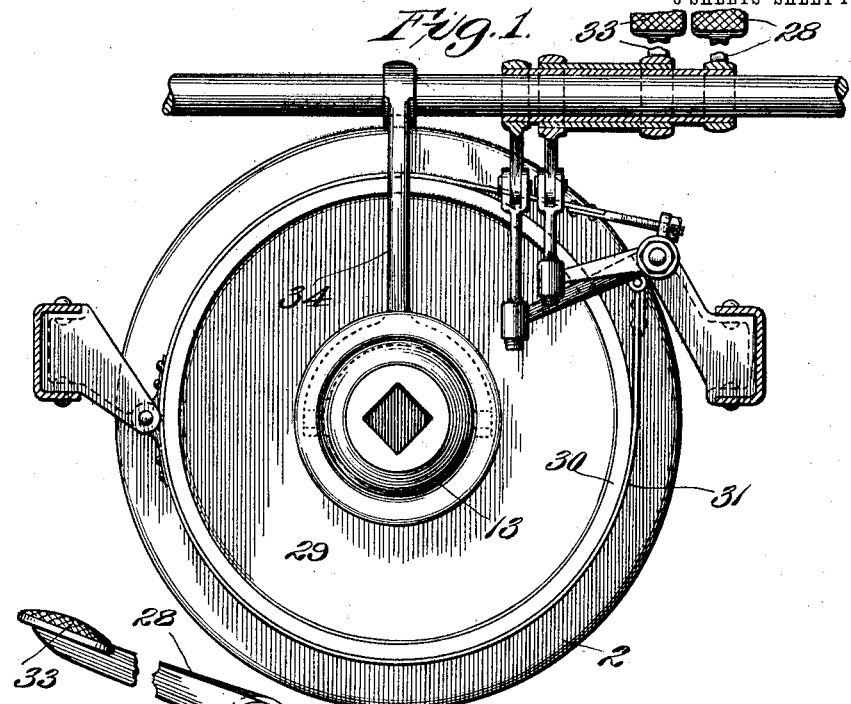
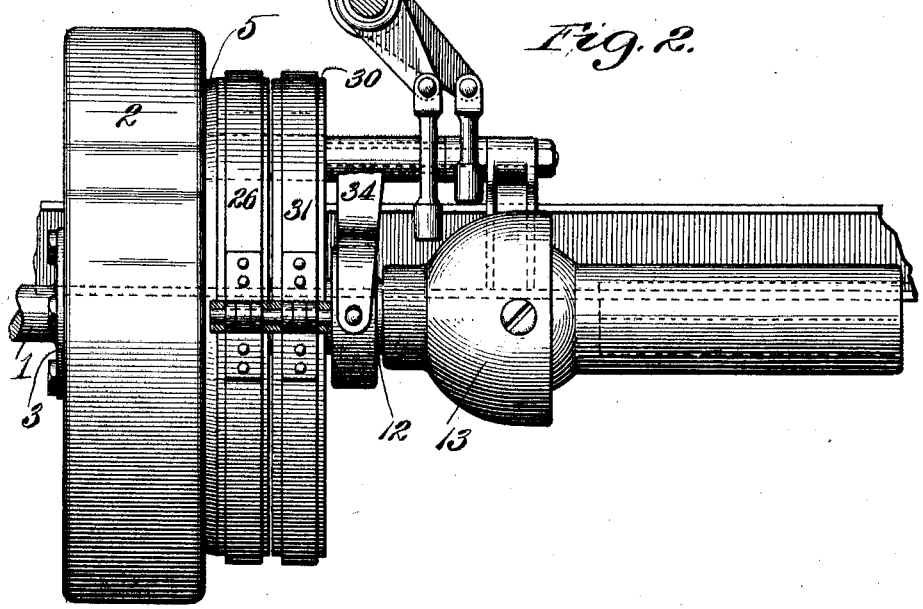
Inventor:
Chas. E. Brooks,
by Rippey & Kingsland
Attys.
Attest

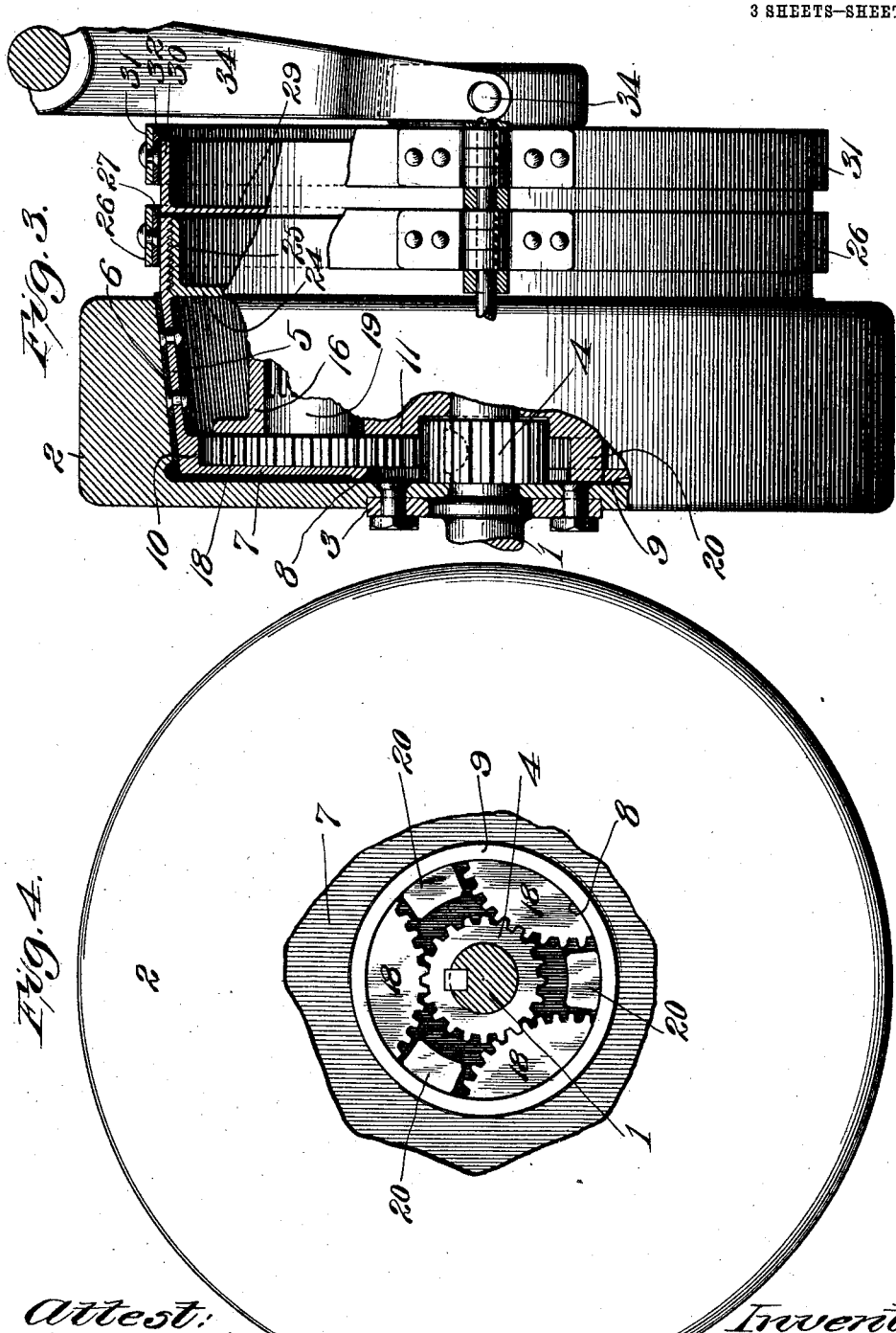

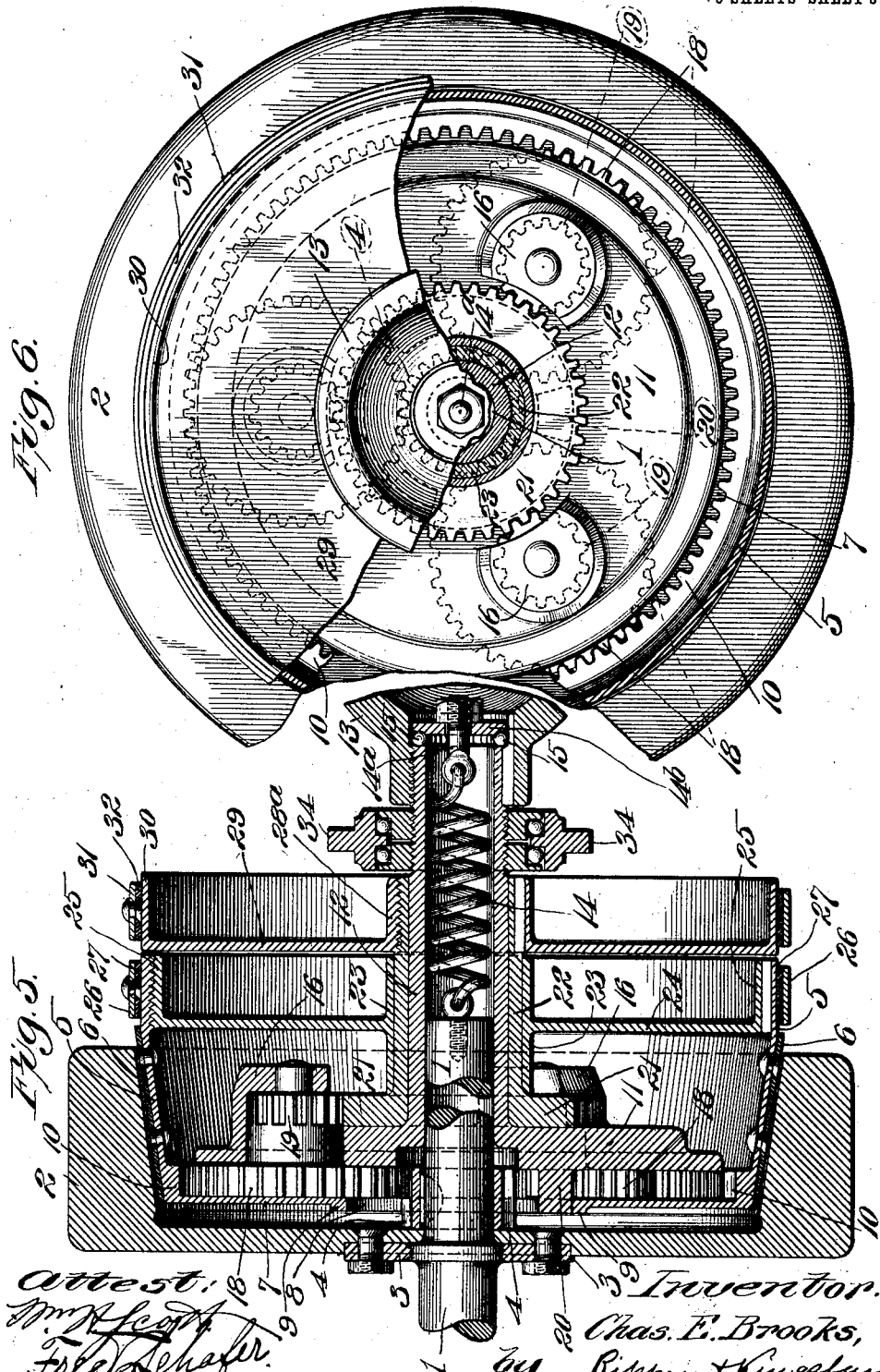

UNITED STATES PATENT OFFICE.

CHARLES E. BROOKS, OF ST. LOUIS, MISSOURI, ASSIGNOR TO BROOKS-LATTA AUTOMOBILE MANUFACTURING COMPANY, OF ST. LOUIS, MISSOURI, A CORPORATION OF MISSOURI.

TRANSMISSION MECHANISM.

1,058,703.  Specification of Letters Patent.  Patented Apr. 8, 1913.

Application filed June 12, 1911. Serial No. 632,729.

*To all whom it may concern:*

Be it known that I, CHARLES E. BROOKS, a citizen of the United States, residing at the city of St. Louis, State of Missouri, have invented a new and useful Transmission Mechanism, of which the following is a specification.

This invention relates to improvements in transmission mechanism, and more particularly to a transmission mechanism combined with a clutch to be used in motor vehicle construction.

The cone clutch and the multiple disk clutch now in common use in automobile construction possess several grave defects. In the cone clutch type, the chief defect is the jerking and jarring of the engine and the car when the clutch is thrown into operative adjustment, usually resulting to a greater or less extent in injury to the mechanism and annoyance to the occupants of the vehicle. The multiple disk clutch seeks to overcome this defect by increasing the friction surface, but it has been found that in order that this type of clutch work smoothly, it is necessary to keep it in very accurate adjustment. Inasmuch as the friction surface wears readily, it is difficult, expensive and troublesome to keep a clutch of this type up to any degree of real efficiency. Transmission mechanism of the planetary type is now recognized in the art as possessing many advantages over other types of transmission mechanism, by reason of its longer life under service, and its simplicity of construction.

Among the objects of my present invention is to retain the best features of the cone clutch, and the planetary type of transmission mechanism, to improve the construction thereof, and so far as possible to eliminate the defects; to combine in one simple, durable mechanism, carried directly within the wheel driven directly by the engine, a clutch and transmission mechanism, which will be operable to transmit power, without loss of efficiency, at varying speed from the engine to the transmission shaft. And which mechanism may be readily thrown into its different adjustments in a gradual manner, thereby eliminating jarring of the mechanism and car. To this and other ends I have arranged and combined the several coöperating parts hereinafter shown, described and claimed, the nature and principle of the operation of which may be readily understood from the following specification taken in connection with the accompanying drawings, in which—

Figure 1 is an end elevation of my improved mechanism; Fig. 2 is a side elevation of the same; Fig. 3 is a side view of the same, parts being in section; Fig. 4 is an end view, a part of the front face of the fly wheel being broken away; Fig. 5 is a longitudinal sectional view, and Fig. 6 is an end view showing in detail the gearing.

1 indicates the main shaft of an engine, to which is rigidly secured in any suitable manner a wheel 2, which in the present instance is the fly wheel of the engine. I have shown for purposes of illustration the wheel 2 bolted to a flange 3 on the main shaft 1. The wheel 2 has its inner surface dished as shown in Figs. 3 and 5, forming one element of a cone clutch, and which is adapted to receive the complementary clutch element hereinafter mentioned. A spur gear 4 is keyed to the main shaft within the dished portion of the wheel 2.

The inner cone member 5, which constitutes an incasement for the trains of gears hereinafter mentioned, is formed substantially in the shape of a truncated cone, the outer surface of which is provided with a layer of friction material 6. Any material such as leather, fiber or canvas may be used for the friction element. The cone member 5 is adapted to engage with the inner surface of the wheel 2, thus constituting a complete cone clutch.

The large end of the cone member 5 is dished or hollowed out in such manner as to leave a thin wall or plate 7, at its small end. Through the plate 7 at its center is an opening 8. The wall of said opening is slightly flared, forming an annular flange 9, which forms a hub on which the inner member 5 revolves, as will be hereinafter explained. The member 5 is provided with an internal gear 10 near its small extremity, which is entrained, through gear connections hereinafter mentioned with the spur gear 4.

A planetary gear support 11 is loosely mounted on the main shaft 1, and is provided with a tubular extension 12, which extension constitutes the transmission shaft.

To the extremity of the transmission shaft 12 is secured one end of a universal coupling 13.

A strong retractile spring 14, has one end thereof secured to the main shaft 1, and the other end to an adjustable holder 14ª, held by an element 14ᵇ revolubly mounted on anti-friction devices 15, having bearing against the end of the transmission shaft 12. Thus it will be seen that the shaft 1 will rotate with the spring 14 without varying the tension of said spring 14, since the support for the end of the spring is freely revoluble. The support 14ª is in the form of a bolt, having a nut bearing against the supporting plate 14ᵇ, said nut being revoluble effectively to reduce or increase the tension of the spring 14 to conform to various requirements. The nut on the adjustable spring holder 14ª is readily accessible through the universal coupling devices 13 for the purposes of manipulation. The spring 14 is effective to actuate the parts toward and hold them in assembled relation, when the clutch lever hereinafter mentioned permits it to act.

The planetary gear support 11 is provided with a number of bearings 16, in each of which is journaled the supporting parts of a planetary gear, comprising the larger gear 18, and the smaller gear 19. The larger planetary gears 18 are permanently in mesh with the pinion 4 attached to the main shaft 1 and are also permanently in mesh with the internal gear 10 on the clutch member 5. In this way, when the clutch is loose or open, the clutch member 5 will be driven or rotated in opposite direction to that of the main shaft 1, from which the power is received.

Protruding lugs 20 on the planetary gear support 11, have their outer surfaces curved, so that each surface is a segment of the same circumference. (See Fig. 4). In assembled adjustment the flange 9 bears on the outer surface of the lugs 20, and may rotate freely thereon. Said lugs thus form the axis whereon the clutch member 5 rotates, when the clutch is open or loose.

A gear 21 is loosely mounted on the transmission shaft 12, and is permanently in mesh with the planetary gears 19 (see Fig. 5). The gear 21 is rigid with a sleeve 22 encircling the transmission shaft 12. A sleeve 23, provided with a web 24, having a peripheral flange 25 is loosely mounted on the sleeve 21, so that it is revoluble thereon. The said flange 25 is externally threaded and secured into the inner end of the clutch member 5 by thread and screw connection therewith. It is apparent that the sleeve 23 with its web 24, and flange 25 form a brace for the open end of the clutch member 5.

A band 26, provided with a layer 27 of friction material encircles the exposed portion of said clutch member 5, which said band through usual lever and treadle connections 28 may be tightened or released by foot pressure, effectively to retard or prevent rotation of the clutch member 5. The sleeve 28ª is secured on the sleeve 22 by thread and screw connection. The sleeve 28ª is provided with a web 29, having a peripheral flange 30, encircled by a band 31, also provided with a layer 32 of friction material. This band 31—32 is also operable through separate lever and treadle connections 33, effectively to retard or prevent rotation of the sleeve 22 and gear 21.

The planetary gear support 11—12 and its carried parts are manually slidable on the main shaft 1, through a ball bearing engaging clutch lever 34, whose function and operation is familiar in the art. It is sufficient for present purposes to state that it consists of lever mechanism operable to engage and disengage the clutch in the usual manner.

In operation, the main shaft 1 is rotated by power derived from the engine. In starting the engine, the clutch is thrown out of frictional engagement by the lever mechanism 34, and the band 26—27 and the band 30—31 released, so that wheel 2, the inner clutch member 5, the train of gearing, comprising the gear wheels 4, 18 and 10, and the gears 19, together with the sleeve 22 will all rotate freely, and no load will be placed on the engine. When it is desired to put the vehicle in forward motion, through the positive rotation of the transmission shaft 12, at low speed, the band 26—27 is tightened through its lever and treadle connection 28. The inner clutch member is thus retarded or held from rotation, which causes a planetary movement of the gears 18 and 19 and their support 11, together with the sleeve 12, constituting the transmission shaft, which is rigid with said support, thereby transmitting power to the driven or operated parts or mechanism. The power or movement thus transmitted is less than the maximum power or movement and is commonly referred to as "low speed."

To obtain the maximum power or speed (commonly known as high speed) the band 26—27 is released, and the engaging clutch lever 24 operated effectively to set or close the clutch member 5 against the inner surface of the wheel 2, thereby causing said member 5 to be driven in the same direction, at the same speed as the wheel 2. This also results in planetary movement or travel of the gear wheels 18—19 and, therefore, in rotation of the planetary gear support 11, and the transmission shaft 12 carried thereby, effectively to transmit power to, and operate the driven parts or machine at high velocity or speed. This velocity or speed may be varied by permitting more or less free or independent movement of the clutch members 2 and 5, a rigid engagement effecting a transmission of the maximum speed to the driven parts; whereas a loose engagement of the clutch members will result in transmission of less than maximum power or speed.

To reverse the direction of travel of the vehicle or to reverse the direction of rotation of the driven parts, the band 30—31 is tightened, effectively to retard or prevent the rotation of the sleeve 22, and gear 21, thus causing a planetary movement or rotation in the reverse direction with respect to the main shaft 1, of the planetary gear support, and the transmission shaft 12 carried thereby, whereby reverse rotation will be transmitted to the driven parts.

It is apparent that several modifications in the design, arrangement and combination of the parts herein shown and described may be made without departure from the spirit and scope of the invention. I do not limit myself, therefore, to exact details, but

What I claim and desire to secure by Letters Patent of the United States is—

1. A transmission mechanism comprising a main shaft, a pinion rigidly secured to said shaft, a gear support mounted on said main shaft provided with a tubular extension constituting a transmission shaft, gears carried by said support arranged to mesh with said pinion, a clutch member rigid with the main shaft, a second clutch member within said first-named clutch member, an internal gear on said second clutch member, meshing with the gears carried by said support, a spring incased within said tubular extension whereby said clutch members are actuated toward closed adjustment, and means for holding said second-named clutch member against rotation effectively to cause said transmission shaft to rotate about said main shaft at a slower speed.

2. A transmission mechanism comprising a main driven shaft, a pinion on said shaft, a gear support mounted on said main shaft provided with a tubular extension constituting a transmission shaft, gears carried by said support arranged to mesh with said pinion, a clutch member rigid with the main shaft, a second clutch member within said first-named clutch member, an internal gear carried by said second clutch member, meshing with the gears carried by said support, an adjustable device automatically actuating said clutch members toward closed adjustment, and manually operated means for locking said clutch members and said gear support together, substantially as described.

3. The combination with a main shaft arranged to be driven, a clutch member and a pinion mounted thereon, of a tubular shaft revolubly carried by one end of said main shaft and being slidable thereon constituting an extension thereof for transmitting power, a gear support carried by said tubular shaft, a plurality of stud shafts journaled in said support, gears on each end of said stud shafts constituting two trains arranged to revolve in vertical parallel planes, a sleeve mounted on said tubular shaft provided with a gear arranged to mesh with one train of gears carried by said gear support, a second clutch member arranged to revolve loosely on said sleeve, an internal gear on said second clutch member and being entrained with the pinion on the main shaft through the second train of gears carried by said gear support, means for holding said sleeve against rotation, means for holding said second clutch member against rotation, and means for moving said tubular shaft and thereby said second clutch member toward and away from said first-named clutch member, substantially as specified.

4. The combination with a rotary shaft, and a recessed fly wheel mounted thereon, of a tubular shaft loosely mounted on said rotary shaft provided with radiating arms, a sleeve mounted on said tubular shaft, a resilient connection between the rotary shaft and tubular shaft, an incasement independently revoluble, a train of gears entraining the rotary shaft, tubular shaft and incasement, a second train of gears entraining said sleeve and tubular shaft, brake mechanism for said incasement, brake mechanism for said sleeve, and manual means for moving said tubular shaft, sleeve and incasement longitudinally of said rotary shaft, substantially as specified.

5. The combination with a rotary shaft, a hollow fly wheel, and a pinion mounted thereon, of a hollow shaft loosely mounted on said rotary shaft provided with radiating arms, a sleeve mounted on said hollow shaft, an incasement independently revoluble of said main shaft, a train of gears entraining the rotary shaft, hollow shaft and incasement, a second train of gears entraining said sleeve and hollow shaft, an adjustable device automatically actuating said incasement into engagement with the fly wheel carried by the rotary shaft, and manual means for moving said hollow shaft, sleeve, and incasement longitudinally, substantially as specified.

6. The combination with a rotary shaft, a pinion thereon, and a clutch member arranged to revolve with said shaft, of a gear support revolubly mounted on said shaft— said gear support being provided with a tubular extension constituting a transmission shaft, a second clutch member within said first clutch member, a sleeve revolubly mounted on said transmission shaft, interrelated gear connections between said rotary shaft sleeve, and said second-named clutch member, a brake device for said second-named clutch member, a treadle device for operating said brake, a brake device for said sleeve, a treadle device for operating said brake, and means for moving said clutch members into and out of frictional engagement with each other, substantially as specified.

7. Transmission mechanism comprising a shaft arranged to be driven, a recessed fly wheel, a gear carrier mounted on said shaft, a transmission shaft rigid with said gear carrier, a sleeve revolubly mounted on said transmission shaft, a tubular case provided with an internal annular rack, gear connections between said first-named shaft, said gear carrier, said case and said sleeve, and brake mechanism for said sleeve and said case, manual means for operating said brake mechanisms, and means for moving said case into and out of frictional engagement with said fly wheel, substantially as specified.

8. A transmission mechanism comprising a main shaft, a pinion thereon, a gear support mounted on said main shaft, gears carried by said support arranged to mesh with said pinion, a clutch member carried by the main shaft, a second clutch member within said first-named clutch member, an internal annular rack carried by said clutch member, an adjustable device automatically actuating said clutch members toward closed adjustment, means for holding said second-named clutch member against rotation, and means for locking and releasing said clutch members, substantially as specified.

9. The combination with a rotary shaft, a pinion and a clutch member rigidly secured thereon, of a gear support loosely mounted on said shaft—said gear support being provided with a tubular extension, a second clutch member within said first clutch member, a sleeve loosely mounted on said tubular extension of the gear support, gear connections between said gear support and said sleeve, gear connections between said rotary shaft and second-named clutch member, means for controlling rotation of said second-named clutch member and sleeve and means for moving said gear support and carried parts longitudinally with respect to said rotary shaft, substantially as specified.

10. The combination with a rotary shaft, a hollow fly wheel and a pinion mounted thereon, of a hollow shaft loosely mounted on said rotary shaft, a hollow sleeve mounted on said hollow shaft, an incasement independently revoluble, a train of gears entraining said rotary shaft, hollow shaft and incasement, a second train of gears entraining said sleeve and hollow shaft, and manual means for moving said hollow shaft, sleeve and incasement longitudinally with respect to said rotary shaft, substantially as specified.

In witness whereof, I have signed this specification in the presence of two subscribing witnesses.

CHARLES E. BROOKS.

Witnesses:
J. D. RIPPEY,
L. C. KINGSLAND.

---

Copies of this patent may be obtained for five cents each, by addressing the "Commissioner of Patents, Washington, D. C."